United States Patent
Miyazawa et al.

(10) Patent No.: US 10,339,809 B2
(45) Date of Patent: Jul. 2, 2019

(54) SAFETY CONFIRMATION ASSIST DEVICE

(71) Applicant: Yazaki Corporation, Minato-ku, Tokyo (JP)

(72) Inventors: Tomohiro Miyazawa, Susono (JP); Masayuki Ogawa, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 0 days.

(21) Appl. No.: 15/355,141

(22) Filed: Nov. 18, 2016

(65) Prior Publication Data
US 2017/0069212 A1    Mar. 9, 2017

Related U.S. Application Data

(63) Continuation of application No. PCT/JP2015/064009, filed on May 15, 2015.

(30) Foreign Application Priority Data

May 21, 2014 (JP) .................................. 2014-105329
May 27, 2014 (JP) .................................. 2014-108934

(51) Int. Cl.
*G08G 1/16* (2006.01)
*B60K 35/00* (2006.01)
(Continued)

(52) U.S. Cl.
CPC .................. *G08G 1/16* (2013.01); *B60J 1/02* (2013.01); *B60K 35/00* (2013.01); *B60R 1/00* (2013.01);
(Continued)

(58) Field of Classification Search
CPC ... G08G 1/16; B60J 1/02; B60K 35/00; B60R 1/00; B60R 21/00
(Continued)

(56) References Cited

U.S. PATENT DOCUMENTS 9,221,384 B2 * 12/2015 Giesler .................. B60Q 9/005
2002/0087269 A1 * 7/2002 Sasaki ....................... B60R 1/00
                                                                701/301
(Continued)

FOREIGN PATENT DOCUMENTS

CN      101356078 A     1/2009
JP      2002-019491 A   1/2002
(Continued)

OTHER PUBLICATIONS

Feb. 27, 2018—(JP) Notification of Reasons for Refusal—App 2014-108934, Eng Tran.
(Continued)

*Primary Examiner* — Omar Casillashernandez
(74) *Attorney, Agent, or Firm* — Banner & Witcoff, Ltd.

(57) ABSTRACT

A safety confirmation assist device is equipped with a presenting unit which presents visible information at a position that a driver of a vehicle can recognize it visually, an object detection unit which detects an object approaching the vehicle; and a control unit which controls the presenting unit, if the object detection unit detects the object, to present the visible information moving in a same direction as a left-right component of a direction in which the object is approaching the vehicle while moving the visible information. The control unit controls the presenting unit so that a movement range of the visible information is located on only the left side or the right side, which is the same side of the vehicle as the object is located, of a boundary that defines the left side and the right side for the driver.

4 Claims, 16 Drawing Sheets

(51) Int. Cl.
*B60J 1/02* (2006.01)
*B60R 1/00* (2006.01)

(52) U.S. Cl.
CPC ........ *G08G 1/166* (2013.01); *B60K 2350/901* (2013.01); *B60R 2300/205* (2013.01)

(58) Field of Classification Search
USPC .......................................................... 340/435
See application file for complete search history.

(56) References Cited

U.S. PATENT DOCUMENTS

| | | | |
|---|---|---|---|
| 2007/0013495 A1* | 1/2007 | Suzuki | B60W 50/14 340/435 |
| 2009/0128311 A1 | 5/2009 | Nishimura et al. | |
| 2010/0020170 A1* | 1/2010 | Higgins-Luthman | B60Q 1/1423 348/135 |
| 2011/0052042 A1* | 3/2011 | Ben Tzvi | G06T 19/006 382/154 |
| 2011/0133916 A1* | 6/2011 | Suzuki | B60K 35/00 340/435 |
| 2013/0107051 A1* | 5/2013 | Maruoka | H04N 7/183 348/148 |
| 2013/0176335 A1* | 7/2013 | Sugiyama | B60K 35/00 345/633 |
| 2015/0103174 A1 | 4/2015 | Emura et al. | |

FOREIGN PATENT DOCUMENTS

| | | |
|---|---|---|
| JP | 2006-088722 A | 4/2006 |
| JP | 2007-210460 A | 8/2007 |
| JP | 2010-155496 A | 7/2010 |
| JP | 2010-176591 A | 8/2010 |
| JP | 2013-134597 A | 7/2013 |
| JP | 2013-159172 A | 8/2013 |
| JP | 2013-203103 A | 10/2013 |
| JP | 2015-096946 A | 5/2015 |
| WO | 2013/094496 A1 | 6/2013 |
| WO | 2014-013641 A1 | 1/2014 |

OTHER PUBLICATIONS

Nov. 22, 2016—(WO) IPRP and Written Opinion—App PCT/JP2015/064009, Eng Tran.

Dec. 19, 2017—(JP) Notification of Reasons for Refusal—App 2014-105329, Eng Tran.

Aug. 4, 2015—International Search Report—Intl App PCT/JP2015/064009.

Apr. 3, 2018—(CN) The First Office Action—App 201580026114.6, Eng Tran.

* cited by examiner

SAFETY CONFIRMATION ASSIST DEVICE

CROSS REFERENCE TO RELATED APPLICATIONS

This application is a continuation of PCT application No. PCT/JP2015/064009, which was filed on May 15, 2015 based on Japanese patent applications No. 2014-105329 filed on May 21, 2014 and No. 2014-108934 filed on May 27, 2014, whose contents are incorporated herein by reference. Also, all the references cited herein are incorporated as a whole.

BACKGROUND OF THE INVENTION

1. Technical Field

The present invention relates to a safety confirmation assist device for assisting a safety check of a driver during driving.

2. Background Art

Safety confirmation assist devices are known which are installed in vehicles and assist a safety check of a driver during driving of the vehicle by presenting visible information to the driver and thereby increase the safety of driving.

Among such safety confirmation assist devices are ones which detect an object that is approaching the vehicle and, if the detected object is judged an object to pay attention to that may come into contact with the vehicle, let the driver recognize that the object to pay attention to is approaching the vehicle by projecting an optical image onto the windshield of the vehicle. This allows the driver to avoid contact of the object to the vehicle by making a dodging manipulation such as deceleration or a course change.

Patent document JP-A-2010-155496 discloses the following prior art technique. If an object to pay attention to is detected on the front-left or front-right of a vehicle, a head-up display flashes and one, located on the same side as the object, of warning display lamps installed on the left and right pillars of the windshield is turned on and off, thereby letting the driver recognize that the object is approaching the vehicle from the left or right side.

SUMMARY

In such a safety confirmation assist device, to allow the driver to start a proper collision avoiding manipulation as soon as possible, it is desired that the driver be able to recognize, intuitively, from which of the left side and the right side an object to pay attention to is approaching upon looking at visible information.

However, in the safety confirmation assist device disclosed in JP-A-2010-155496, when looking at presented displays, the driver cannot necessarily recognize that an object to pay attention to is approaching the vehicle from the front-left or front-right. For example, since the driver is looking forward during driving, first, he or she would see flash light emitted from the head-up display. However, since the flash light is emitted according to the position of the object to pay attention to rather than whether the object is approaching from its left side or right side, based on this flash light the driver may not be able to recognize from which of the left side and the right side the object is approaching. Furthermore, although one of the warning display lamps installed on the left and right pillars is turned on and off, when the driver looks at the warning display lamp being turned on and off, he or she cannot necessarily recognize, intuitively, that the object is approaching the vehicle even if he or she can recognize that a certain obstacle exists in the direction indicated by the warning display lamp.

When it is highly probable that an object to pay attention to will collide with the vehicle, the driver should start a dodging manipulation as soon as possible and hence the safety confirmation assist device needs to let the driver recognize, quick and intuitively, from which of the left side and the right side of the vehicle the object is approaching. However, it cannot be said that the safety confirmation assist device disclosed in Patent document 1 satisfies this requirement.

The present invention has been made in view of the above circumstances, and an object of the invention is therefore to provide a safety confirmation assist device capable of improving the manner of a driver's recognition of an approach of an object to pay attention to.

To attain the above object, the safety confirmation assist device according to the invention is characterized as set forth in the following items (1) to (12):

(1) A safety confirmation assist device comprising a presenting unit which presents visible information at a position that a driver of a vehicle can recognize it visually; an object detection unit which detects an object that is approaching the vehicle; and a control unit which controls the presenting unit, if the object detecting unit detects the object, to present the visible information moving in the same direction as a left-right component of a direction in which the object is approaching the vehicle, wherein:

the control unit controls the presenting unit so that a movement range of the visible information is located on only a left side or a right side, which is the same side of the self vehicle as the object is located, of a boundary that defines the left side and the right side for the driver who is looking forward in a driving direction.

(2) The safety confirmation assist device according to item (1), wherein the control unit controls the presenting unit so that a starting end, where movement of the visible information is started, of the movement range of the visible information is located on a straight line from the driver to the object.

(3) A safety confirmation assist device comprising a presenting unit which presents visible information at a position that a driver of a vehicle can recognize it visually; an object detection unit which detects an object that is approaching the vehicle; a control unit which controls the presenting unit, if the object detection unit detects the object, to present the visible information moving in the same direction as a left-right component of a direction in which the object is approaching the vehicle; and a line-of-sight detecting unit which detects a line of sight of the driver, wherein:

the control unit controls the presenting unit so that a movement range of the visible information is located on only a left side or a right side, which is the same side of the vehicle as the object is located, of a boundary that defines the left side and the right side using, as a reference, the line of sight of the driver detected by the line-of-sight detecting unit.

(4) The safety confirmation assist device according to item (3), wherein the control unit controls the presenting unit so that the distances between the boundary and a starting end where movement of the visible information is started and a finishing end where the movement is finished are kept constant.

(5) The safety confirmation assist device according to any one of items (1) to (4), wherein the presenting unit projects the visible information onto a windshield of the vehicle.

(6) The safety confirmation assist device according to any one of items (1) to (4), wherein the presenting unit is disposed on inner wall surfaces of a vehicle compartment of the vehicle.

(7) The safety confirmation assist device according to any one of items (1) to (6), wherein:

the object detection unit detects a relative distance between the object and the vehicle; and the control unit controls the presenting unit so that at least one of the movement speed, luminance, stroke width, and optical image size of the visible information increases as the relative distance detected by the object detection unit becomes shorter.

(8) The safety confirmation assist device according to any one of items (1) to (7), wherein:

the object detection unit detects a relative distance between the object and the vehicle; and the control unit controls the presenting unit so that at least one of the movement speed, luminance, stroke width, optical image size, and repetition frequency of the visible information increases as the variation of the relative distance detected by the object detection unit becomes larger.

(9) The safety confirmation assist device according to any one of items (1) to (8), further comprising a first sound presenting device and a second sound presenting device each of which outputs sound information, wherein:

the first sound presenting device and the second sound presenting device are installed on the left side and the right side of the boundary, respectively; and the control unit controls the first sound presenting device and the second sound presenting device so that the sound pressure of the sound information that is output from one, located on the left side or the right side of the driver, which is the same side of the vehicle as the object is located on, of the first sound presenting device and the second sound presenting device is decreased gradually and the sound pressure of the sound information that is output from the other, located on the left side or the right side of the driver, being the opposite side of the vehicle to the side where the object is located on, of the first sound presenting device and the second sound presenting device is increased gradually.

(10) The safety confirmation assist device according to any one of items (1) to (8), further comprising a first sound presenting device and a second sound presenting device each of which outputs sound information, wherein:

the first sound presenting device and the second sound presenting device are installed on the left side and the right side of the boundary, respectively; and the control unit controls the first sound presenting device and the second sound presenting device so that the one, located on the left side or the right side of the driver, which is the same side of the vehicle as the object is located on, of the first sound presenting device and the second sound presenting device outputs sound information.

(11) The safety confirmation assist device according to any one of items (1) to (10), further comprising a first vibration presenting device and a second vibration presenting device each of which generates vibration, wherein:

the first vibration presenting device and the second vibration presenting device are installed on the left side and the right side of the driver, respectively; and the control unit controls the first vibration presenting device and the second vibration presenting device so that the vibration strength of one, located on the left side or the right side of the driver, which is the same side of the vehicle as the object is located on, of the first vibration presenting device and the second vibration presenting device is decreased gradually and the vibration strength of the other, located on the left side or the right side of the driver, being the opposite side of the vehicle to the side where the object is located on, of the first vibration presenting device and the second vibration presenting device is increased gradually.

(12) The safety confirmation assist device according to any one of items (1) to (10), further comprising a first vibration presenting device and a second vibration presenting device each of which generates vibration, wherein:

the first vibration presenting device and the second vibration presenting device are installed on the left side and the right side of the driver, respectively; and the control unit controls the first vibration presenting device and the second vibration presenting device so that the one, located on the left side or the right side of the driver, which is the same side of the vehicle as the object is located on, of the first vibration presenting device and the second vibration presenting device generates vibration.

In the safety confirmation assist device having the configuration of item (1), the control unit controls the presenting unit so that it presents the visible information with a movement of the visible information in the same direction as a left-right component of a direction in which the object is approaching the vehicle, and that a movement range of the visible information is located on only the left side or the right side, which is the same side of the vehicle as the object is located, of a boundary that defines the left side and the right side for the driver who is looking forward in a driving direction. Thus, since the visible information is being moved leftward or rightward, by visually recognizing the visible information, the driver can recognize from which of the left side and the right side of the vehicle the object is approaching. Furthermore, since a movement range of the visible information is located on only the left side or the right side, which is the same side of the vehicle as the object is located, of a boundary that defines the left side and the right side of the driver (base point), an event can be suppressed that when looking at visible information the driver erroneously recognizes that it indicates something other than an approach of the object from the front-left or front-right of the vehicle.

According to the safety confirmation assist device having the configuration of item (2), since the control unit sets a starting end where movement of the visible information is started on a straight line from the driver to the object, by looking at the visible information, the driver can not only recognize that the object is approaching the vehicle from its left side or right side but also recognize a current position of the object visually.

In the safety confirmation assist device having the configuration of item (3), the control unit controls the presenting unit so that it presents the visible information with a movement of the visible information in the same direction as a left-right component of a direction in which the object is approaching the vehicle while moving the visible information, and that a movement range of the visible information is located on only the left side or the right side, which is the same side of the vehicle as the object is located, of a boundary that defines the left side and the right side of the line of sight of the driver. Thus, since the visible information is being moved leftward or rightward, by visually recognizing the visible information, the driver can recognize from which of the left side and the right side of the vehicle the object is approaching. Furthermore, since a movement range of the visible information is located on only the left side or the right side, which is the same side of the vehicle as the object is located, of a boundary that defines the left side and the right side of the line of sight of the driver, an event can be suppressed that when looking at visible information the driver erroneously recognizes that it indicates something other than an approach of the object from the front-left or front-right of the vehicle. Still further, since the display position of the visible information is varied depending on the line of sight of the driver, even in a case that the driver is looking in a direction that is different from a driving direction, he or she can recognize the visible information visually and correctly recognize from which of the left side and the right side of the vehicle the object is approaching the vehicle.

According to the safety confirmation assist device having the configuration of item (4), since the control unit keeps constant the distance between the boundary and a starting end where movement of the visible information is started and a finishing end where the movement is finished, by looking at the visible information the driver can recognize that the object is approaching the vehicle from its left side or right side even in a case that the driver has moved his or her line of sight.

In the safety confirmation assist device having the configuration of item (5), the presenting unit projects the visible information onto the windshield of the vehicle, the driver can recognize the visible information visually without the need for moving the line of sight from a vehicle driving direction.

In the safety confirmation assist device having the configuration of item (6), the presenting unit is disposed on inner wall surfaces of a vehicle compartment of the vehicle. Thus, the safety confirmation assist device can present visible information to the driver irrespective of whether the vehicle is equipped with a head-up display.

In the safety confirmation assist device having the configuration of item (7), the control unit increases at least one of the movement speed, luminance, stroke width, and optical image size of the visible information increases as the relative distance detected by the object detection unit becomes shorter. This makes it possible to present a display that would arouse more attention of the driver as the variation of the relative distance becomes larger and the level of emergency becomes higher.

In the safety confirmation assist device having the configuration of item (8), the control unit increases at least one of the movement speed, luminance, stroke width, optical image size, and repetition frequency of the visible information as the variation of the relative distance detected by the object detection unit becomes larger. This makes it possible to present a display that would arouse more attention of the driver as the variation of the relative distance becomes larger and the level of emergency becomes higher.

In the safety confirmation assist device having the configuration of item (9), the control unit controls the first sound presenting device and the second sound presenting device so that the sound pressure of the sound information that is output from one, located on the left side or the right side of the driver, which is the same side of the vehicle as the object is located on, of the first sound presenting device and the second sound presenting device is decreased gradually and the sound pressure of the sound information that is output from the other, located on the left side or the right side of the driver, being the opposite side of the vehicle to the side where the object is located on, of the first sound presenting device and the second sound presenting device is increased gradually. Thus, the driver can recognize that the sound information that is presented on the same side as the object is located on is moving gradually toward the opposite side. As such, the driver can recognize from which of the left side and the right side of the vehicle the object is approaching by not only seeing the visible information but also hearing the sound information. According to the safety confirmation assist device having the configuration of item (10), since the sound presenting device located on the same side as the object outputs sound information, the driver can recognize from which of the left side and the right side of the vehicle the object is approaching by not only seeing the visible information but also hearing the sound information.

In the safety confirmation assist device having the configuration of item (11), the control unit controls the first vibration presenting device and the second vibration presenting device so that the vibration strength of one, located on the left side or the right side of the driver, which is the same side of the vehicle as the object is located on, of the first vibration presenting device and the second vibration presenting device is decreased gradually and the vibration strength of the other, located on the left side or the right side of the driver, being the opposite side of the vehicle to the side where the object is located on, of the first vibration presenting device and the second vibration presenting device is increased gradually. Thus, the driver can recognize that the vibration that is presented on the same side as the object is located is moving gradually toward the opposite side. As such, the driver can recognize from which of the left side and the right side of the vehicle the object is approaching by not only seeing the visible information but also feeling the vibration information. According to the safety confirmation assist device having the configuration of item (12), since the vibration presenting device located on the same side as the object outputs vibration, the driver can recognize from which of the left side and the right side of the vehicle the object is approaching by not only seeing the visible information but also feeling the vibration information.

The safety confirmation assist device according to the invention can improve the manner of a driver's recognition of an approach of an object to pay attention to.

The invention has been described above concisely. The details of the invention will become more apparent when the modes for carrying out the invention (hereinafter referred to as embodiments) described below are read through with reference to the accompanying drawings.

DETAILED DESCRIPTION OF EMBODIMENTS

Safety confirmation assist device according to respective embodiments of the present invention will be hereinafter described with reference to the drawings.

Embodiment 1

Figure 1:
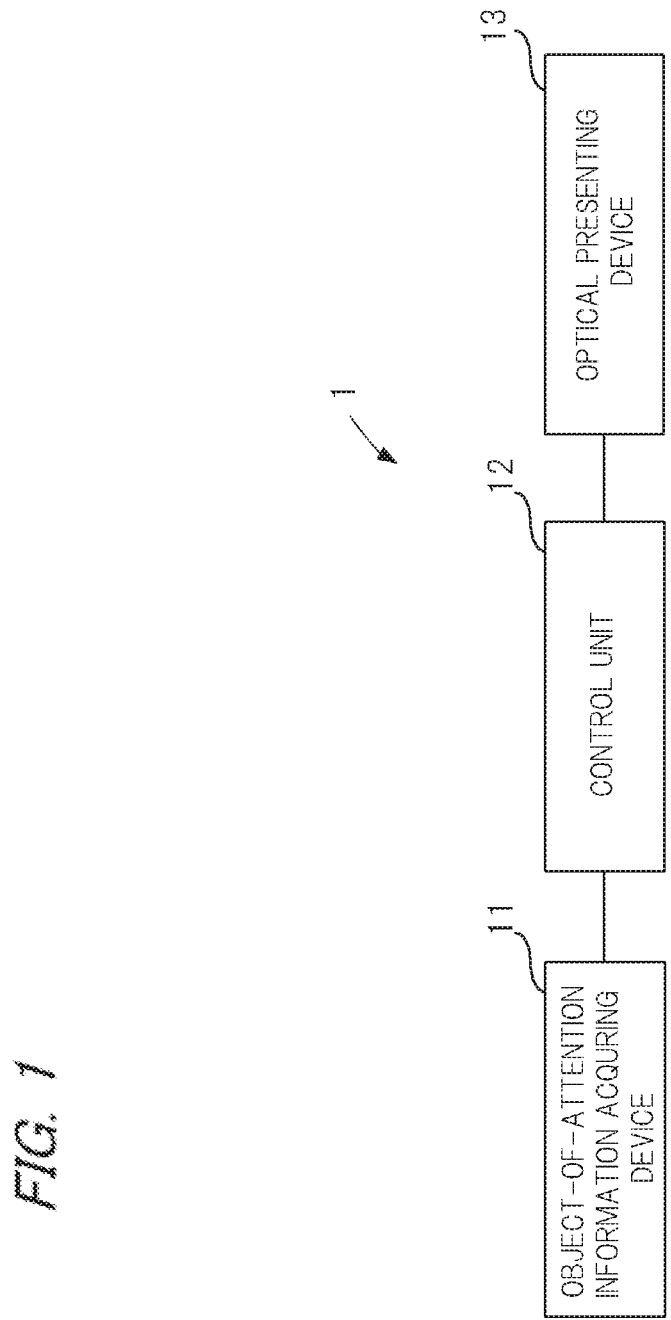
FIG. 1 is a block diagram showing an example configuration of a safety confirmation assist device according to a first embodiment.

FIG. 1 shows an example configuration of a safety confirmation assist device 1 according to a first embodiment. The safety confirmation assist device 1 shown in FIG. 1 is equipped with an object-of-attention information acquiring device 11 for detecting an object that is approaching the vehicle and a control unit 12 for causing an optical presenting device 13 to present visible information on the basis of information acquired by the object-of-attention information acquiring device 11. The optical presenting device 13 serves to present visible information on the windshield of the automobile.

More specifically, the object-of-attention information acquiring device 11 has an infrared laser for measuring a direction and a distance of an object on the basis of a time difference and a phase difference between emitted infrared light and infrared light reflected from the object, and detects an object, such as another vehicle, a bicycle, or a pedestrian, that exists around the vehicle and is approaching. When detecting an object, the object-of-attention information acquiring device 11 outputs, to the control unit 12, as object-of-attention information, a signal indicating a direction of the object relative to the vehicle and a distance between the vehicle and the object. The object-of-attention information is output repeatedly at a prescribed time interval.

The object-of-attention information acquiring device 11 may have, instead of or in addition to the infrared laser, a millimeter-wave radar, an ultrasonic radar, a camera, an intervehicle communication device for data communication between the vehicle and another vehicle, a road-to-vehicle communication device for data communication between the vehicle and roadside apparatus installed alongside a driving route, a pedestrian-to-vehicle communication device for data communication between the vehicle and a terminal held by a pedestrian, or the like.

The optical presenting device 13 is a device for presenting visible information at such a position that the driver who is looking forward in a vehicle driving direction can recognize it visually. For example, the optical presenting device 13 is configured in such a manner that a case housing a light source is installed inside the instrument panel and visible information 23 is presented on a windshield 29 of the vehicle by projecting output light onto the windshield 29 from a top portion of the case.

The control unit 12 has a CPU, a RAM, a ROM, and an input I/F (none of which are shown), and a signal that is received from the object-of-attention information acquiring device 11 is input to the CPU or the RAM via the input I/F. The CPU performs various kinds of computation according to programs that are stored in the ROM in advance and outputs, to the optical presenting device 13, on the basis of computation results, a signal for causing the optical presenting device 13 to present visible information 23.

Upon acquiring object-of-attention information from the object-of-attention information acquiring device 11, the control unit 12 calculates a direction of an object relative to the vehicle on the basis of the object-of-attention information and calculates a time TTC (time-to-collision) to a collision between the vehicle and the object that will occur if the driver does not make a dodging manipulation on the basis of a variation of the relative distance between the vehicle and the object in a prescribed time.

If judging, on the basis of the TTC calculation result, that the object is close to the vehicle and it is necessary to let the driver perform a dodging manipulation for dodging the object, the control unit 12 controls the optical presenting device 13 to cause it to present visible information 23 indicating that the object is approaching the vehicle. This judgment is made, for example, through comparison with a threshold value that is stored in the ROM in advance; the control unit 12 judges that presentation of visible information 23 is necessary if the TTC is shorter than the threshold value. Alternatively, the control unit 12 may judge that presentation of visible information 23 is necessary if the relative distance between the vehicle and the object is shorter than a predetermined threshold value, instead of using the TTC.

In the embodiment, the control unit 12 calculates a left-right component of a direction in which an object is approaching the vehicle on the basis of this direction, and controls the optical presenting device 13 so that it presents visible information 23 while moving it in the same direction as the calculated left-right component. In the embodiment, the term "vehicle left-right direction" means a left-right direction defined in a state that a scene ahead of the vehicle in a vehicle driving direction is viewed from the vehicle (base point). Likewise, the term "driver left-right direction" means a left-right direction defined for the driver (base point) who is looking forward in a vehicle driving direction.

The control unit 12 is configured so as to control the optical presenting device 13 so that a movement range 25 of visible information 23 is located on the same side of a left/right boundary 21 for the driver who is looking forward in a driving direction as the object approaching side of the vehicle in the left-right direction. The boundary 21 is a vertical plane that is perpendicular to the road surface (horizontal surface), is parallel with the vehicle driving direction, and passes through approximately the center of the driver.

Figure 2:
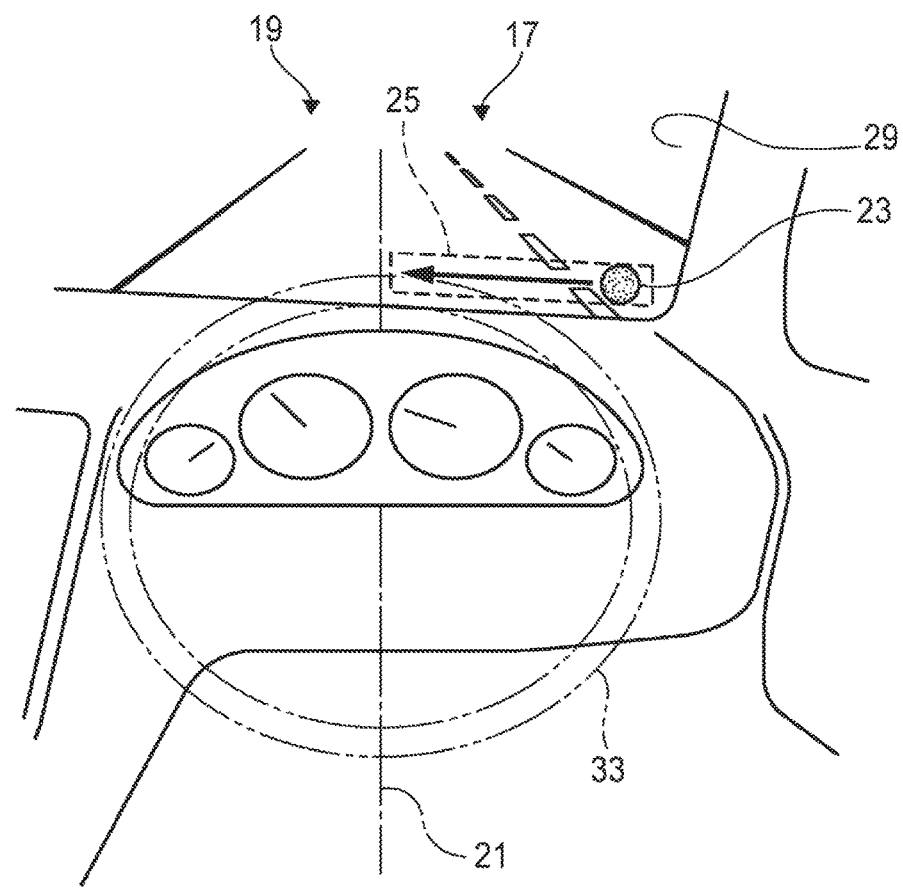
FIG. 2 is a front view showing an example manner of presentation of visible information for warning that a first object of attention is approaching.

In FIG. 2, the boundary 21 is drawn as a straight line that extends perpendicularly to the road surface when the windshield 29 is seen forward in the vehicle driving direction. If the object-of-attention information acquiring device 11 detects an object that is approaching the vehicle from the right side, the control unit 12 controls the optical presenting device 13 so that, as shown in FIG. 2, the movement range 25 of visible information 23 is located on the right side of the driver, that is, on the right side 17 of the boundary 21.

The control unit 12 sets a finishing end, where a series of movements of visible information 23 is to finish, of the movement range 25 of the visible information 23 at a position that is not located on the other side of the boundary 21. With this measure, when looking at the visible information 23 presented by the optical presenting device 13, the driver can recognize reliably that the object is approaching the vehicle from the right side and can perform a manipulation for dodging the approaching object.

The control unit 12 may vary at least one of the color, movement speed, luminance, stroke width, optical image size, and repetition frequency of visible information 23 according to the TTC value or the relative distance between the vehicle and an object. In this case, for example, the control unit 12 increases the movement speed, luminance, stroke width, optical image size, or repetition frequency or varies the color of visible information 23 from a bluish color to a color (e.g., reddish color) that would arouse attention of the driver as the TTC value becomes smaller or the relative distance becomes shorter. That is, the control unit 12 tries to arouse more attention of the driver as the TTC value becomes smaller. Alternatively, the control unit 12 may vary at least one of the color, movement speed, luminance, stroke width, optical image size, and repetition frequency of visible information 23 according to the variation of the relative distance rather than the TTC value or the relative distance between the vehicle and an object. In this case, the control unit 12 causes presentation of a display that would arouse more attention of the driver as the variation of the relative distance increases.

In FIG. 2, the movement range 25 of the visible information 23 extends in the horizontal direction, that is, perpendicularly to the boundary 21. However, the invention is not limited to this case; the movement range 25 may be formed on the windshield 29 so as to form an inclination angle with the horizontal direction. The inclination angle may be in such a range as to allow the driver to recognize that an object is approaching the vehicle from its left side or right side when he or she looks at moving visible information 23.

Figure 3:
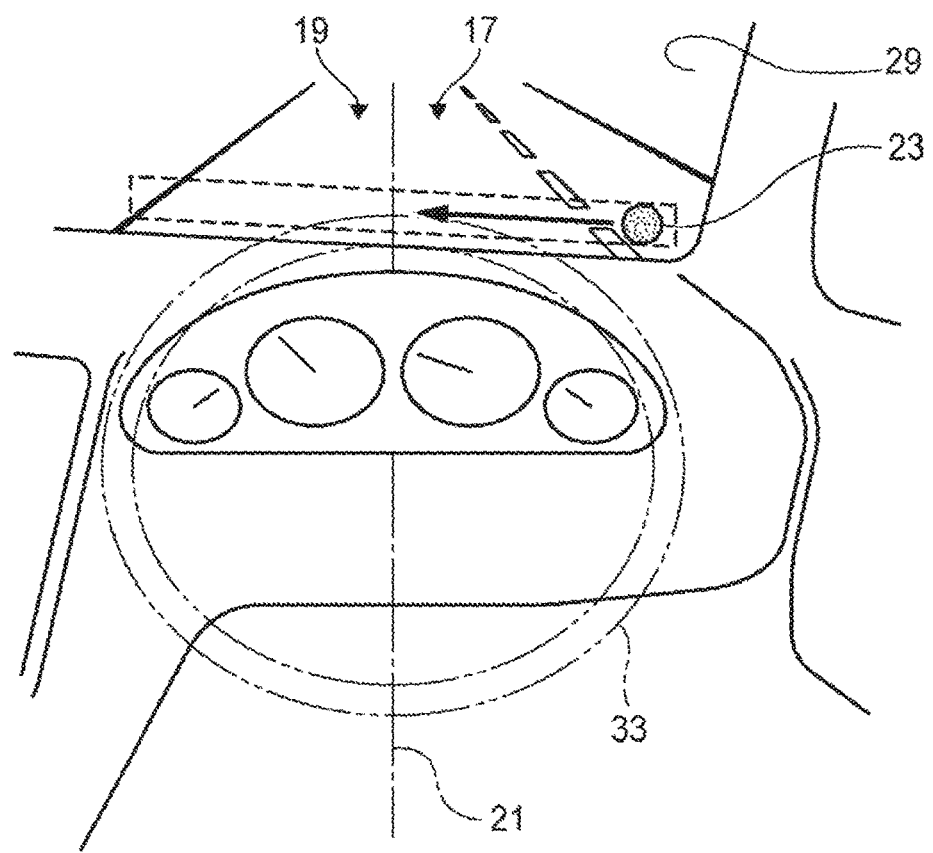
FIG. 3 is a front view showing an example manner of presentation in a case that there is one region where visible information can be presented by an optical presenting device used in the first embodiment.

FIG. 3 is a front view showing an example manner of presentation in a case that there is one region where visible information 23 can be presented by the optical presenting device 13. In this case, the control unit 12 sets, in the region, left and right movement ranges 25 that are located on the left side 19 and the right side 17 of the boundary 21, respectively, and do not cross the boundary 21.

Figure 4:
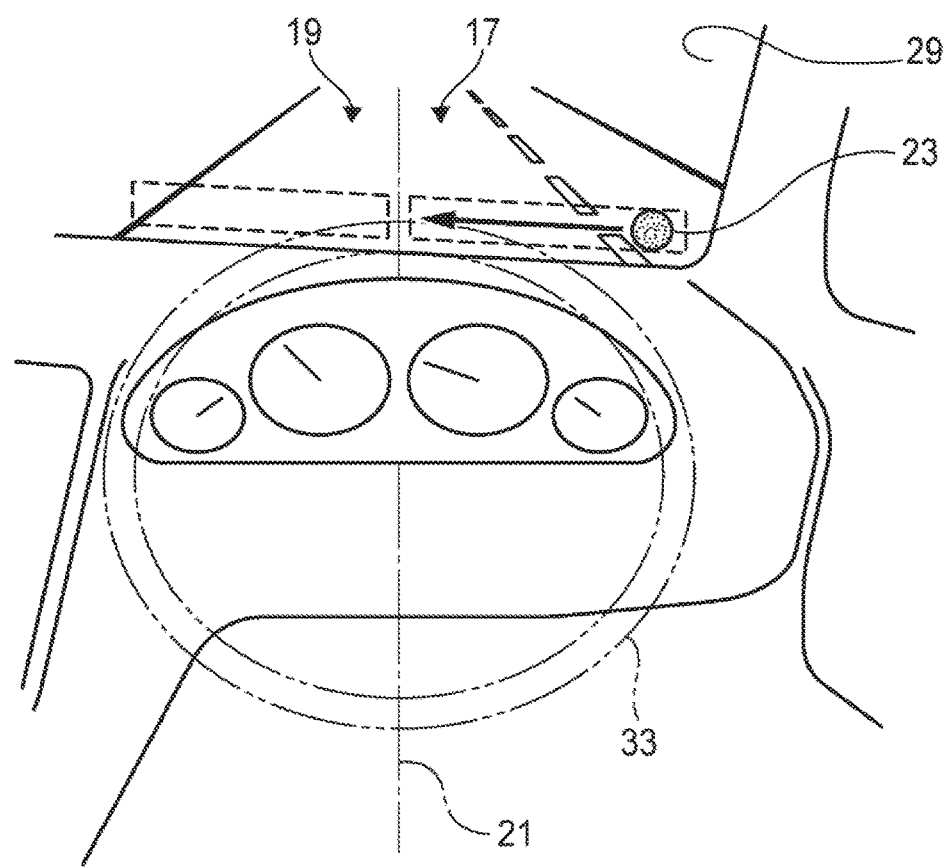
FIG. 4 is a front view showing an example manner of presentation in a case that there are two regions where visible information can be presented by the optical presenting device used in the first embodiment.

FIG. 4 is a front view showing an example manner of presentation in a case that there are two regions where visible information 23 can be presented by the optical presenting device 13. In this case, the regions are formed (i.e., set) on the left and right of the boundary 21, respectively, so as not to cross the boundary 21. Thus, the control unit 12 sets left and right movement ranges 25 so that they correspond to the respective regions.

Figure 5:
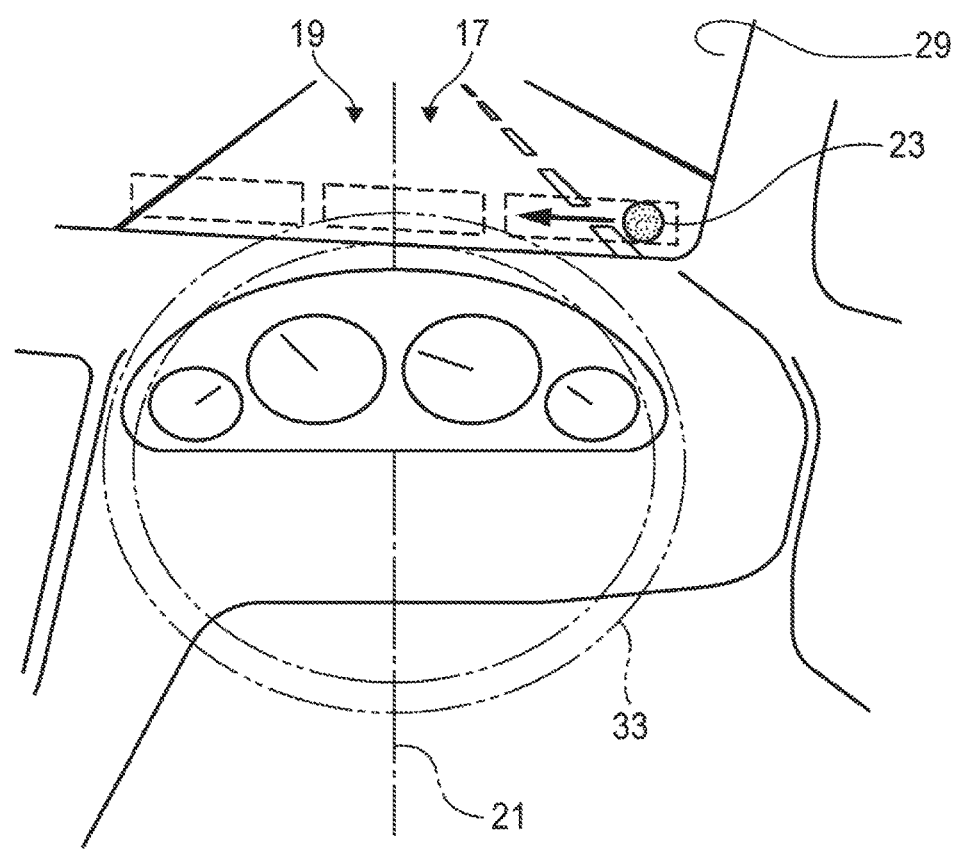
FIG. 5 is a front view showing an example manner of presentation in a case that there are three regions where visible information can be presented by the optical presenting device used in the first embodiment.

FIG. 5 is a front view showing an example manner of presentation in a case that there are three regions where visible information 23 can be presented by the optical presenting device 13. In this case, whereas the central region crosses the boundary 21, the left and right regions are set so as not to cross the boundary 21. Thus, the control unit 12 sets left and right movement ranges 25 so that they correspond to the respective regions.

Figure 6:
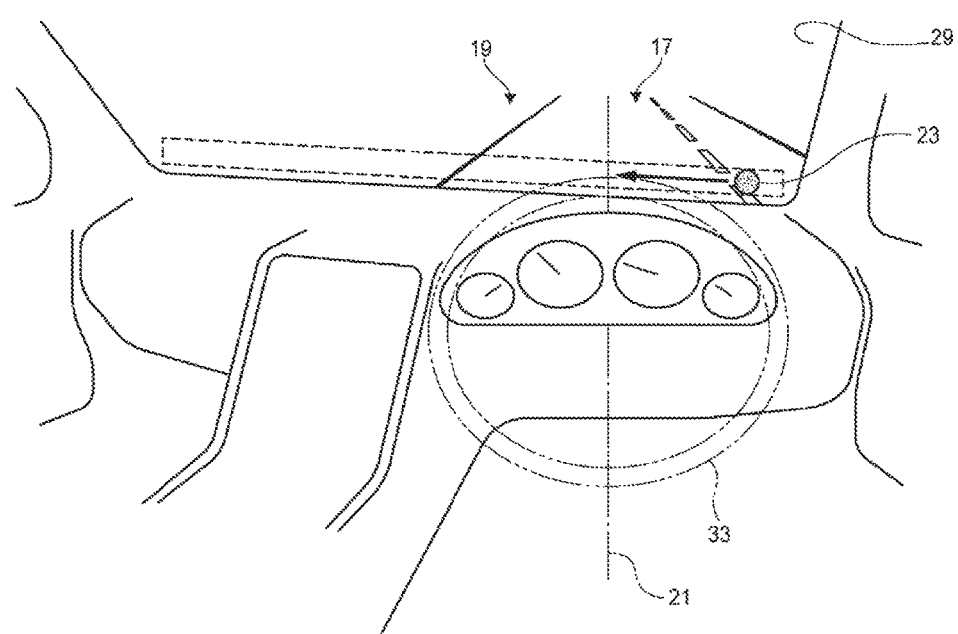
FIG. 6 is a front view showing an example manner of presentation in a case that a region where visible information can be presented by the optical presenting device used in the first embodiment extends over the full length of the windshield in the horizontal direction.

FIG. 6 is a front view showing an example manner of presentation in a case that a region where visible information 23 can be presented by the optical presenting device 13 extends over the full length of the windshield in the horizontal direction. In this case, the control unit 12 sets, in the region, left and right movement range 25 on the left side 19 and right side 17 of the boundary 21, respectively, so as not to cross the boundary 21.

Figure 7:
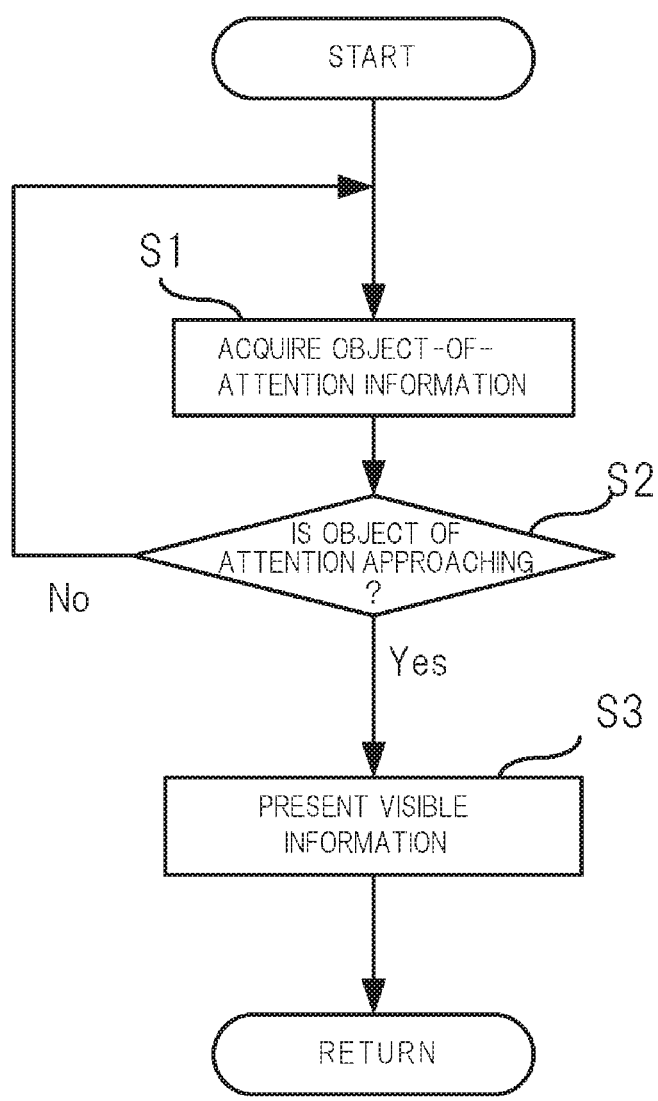
FIG. 7 is a flowchart illustrating the details of a control for causing the optical presenting device used in the first embodiment to present visible information.

FIG. 7 is a flowchart illustrating the details of a control process for causing the optical presenting device 13 to present visible information 23. A control program for this purpose is stored in the ROM of the control unit 12 and run by the CPU.

First, at step S1, the CPU acquires object-of-attention information from the object-of-attention information acquiring device 11 repeatedly at a prescribed time interval.

Subsequently, at step S2, the CPU judges, on the basis of the acquired object-of-attention information, whether to cause the optical presenting device 13 to display visible information 23 indicating that an object that may collide with the vehicle is approaching.

The object-of-attention information includes a direction of an object relative to the vehicle and a distance from the vehicle to the object. Thus, the CPU calculates a TTC on the basis of the distance from the vehicle to the object and a variation of the distance, and judges that an object that may collide with the vehicle is approaching if the TTC is smaller than a threshold value.

If judging that an object that may collide with the vehicle is approaching (S2: yes), the CPU sends the optical presenting device 13 a signal for causing it to present visible information 23 at step S3. At this time, the CPU judges, on the basis of the object-of-attention information, whether the object is located on the left side or the right side of the vehicle. If judging that the object is located on the right side of the vehicle, the CPU causes the optical presenting device 13 to display visible information 23 on the windshield 29 in such a manner that it is moved right to left. The CPU sets a movement range 25 in such a manner that its finishing end is not located on the other side of the boundary 21 and, as a result, the entire movement range 25 (from its starting end to its finishing end) is presented on the right side 17 of the driver. On the other hand, if judging that the object is located on the left side of the vehicle, the CPU causes the optical presenting device 13 to display visible information 23 on the windshield 29 in such a manner that it is moved left to right. The CPU sets a movement range 25 in such a manner that its finishing end is not located on the other side of the boundary 21 and, as a result, the entire movement range 25 (from its starting end to its finishing end) is presented on the left side 19 of the driver.

If the CPU judges at step S2 that no object that may collide with the vehicle is approaching, the process returns to step S1.

The above description is directed to the case that the control unit 12 sets a starting end and a finishing end of presentation of visible information at predetermined positions. However, the invention is not limited to this case; the control unit 12 may set a starting end of presentation of visible information at a point on a straight line from the driver to the object. With this measure, since the starting end of a movement range 25 of visible information is set on a straight line from the driver to the object, by looking at the visible information, the driver can not only recognize that the object is approaching the vehicle from its left side or right side but also visually recognize a current position determined of the object.

Figure 8:
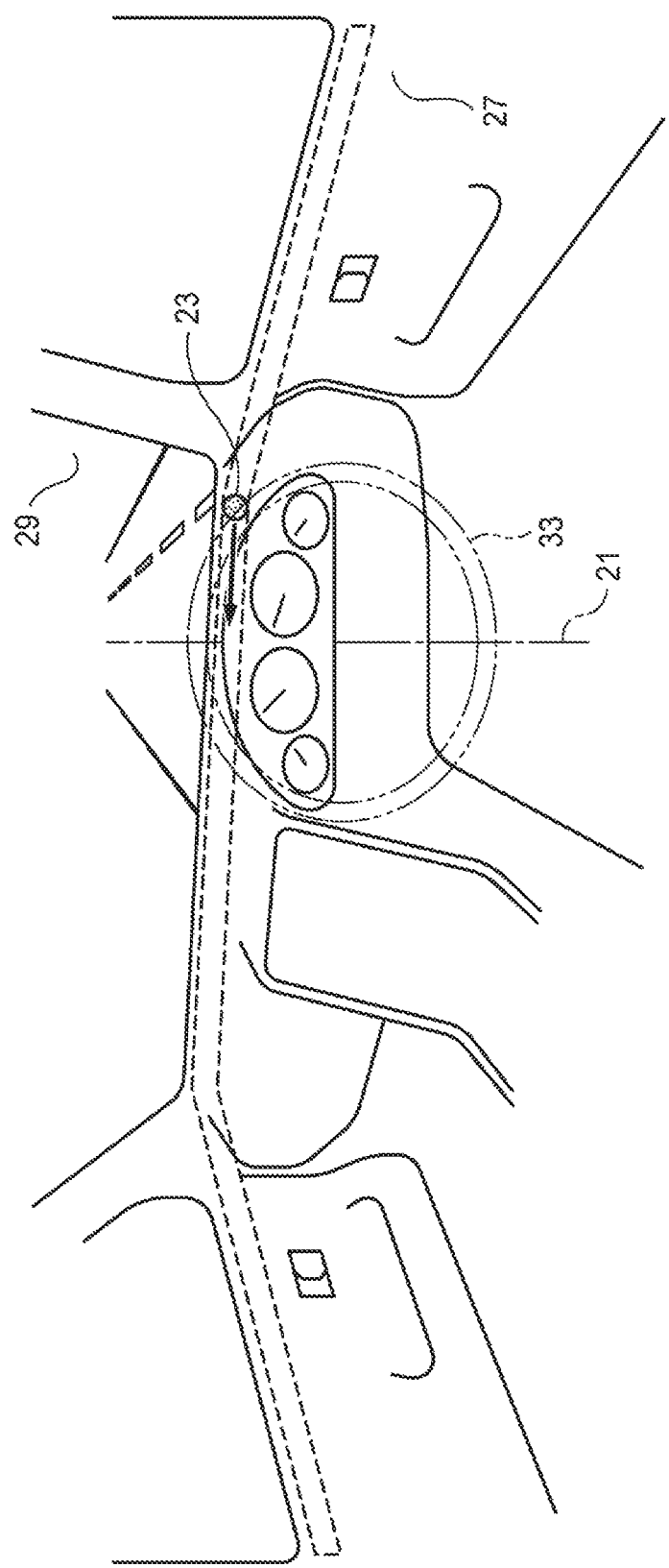
FIG. 8 is a front view showing an example manner of presentation in a case that the optical presenting device used in the first embodiment is installed in the whole of the vehicle compartment.

Although the above description is directed to the case that the optical presenting device 13 is a head-up display, as shown in FIG. 8 the optical presenting device 13 may be disposed on inner wall surfaces 27 of the instrument panel, doors, dashboard, etc. that form the vehicle compartment. For example, the optical presenting device 13 is composed of known light sources such as LEDs or light bulbs. Alternatively, a display may be formed on the inner wall surfaces 27 in such a manner that visible information is presented in a prescribed region of the display.

Although the above description is directed to the case that the safety confirmation assist device 1 notifies the driver of an approach of an object using only visible information 23, the safety confirmation assist device 1 may do so using sound information or vibration information in addition to visible information 23.

Where the safety confirmation assist device 1 uses sound information, the safety confirmation assist device 1 is further equipped with a first sound presenting device and a second sound presenting device which output respective pieces of sound information and which are installed on the right side 17 and the left side 19 of the driver, respectively in the vehicle compartment. Each of the first sound presenting device and the second sound presenting device is a known sound output device such as a speaker. It is preferable that each piece of sound information be a continuous sound such as a buzzer sound or a chime.

Figure 9:
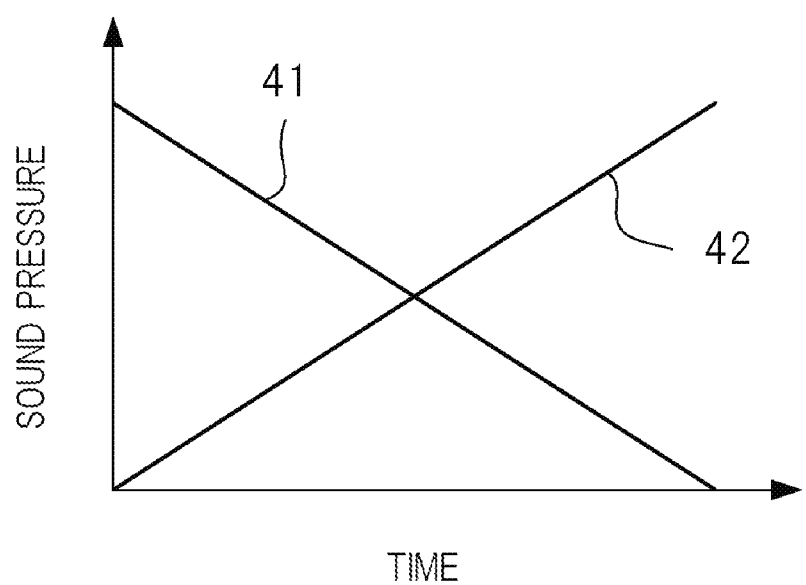
FIG. 9 is a graph showing a relationship between the time and the sound pressures of respective pieces of sound information in a case that pieces of sound information are presented by respective sound presenting devices.

If judging that an object is approaching the vehicle from the right side, the control unit 12 causes presentation of visible information 23 in the above-described manner and also causes output of pieces of sound information for notifying the driver that the object is approaching in such a manner that the output sound pressure of the first sound presenting device is higher than that of the second sound presenting device. As shown in FIG. 9, whereas the output sound pressure of the first sound presenting device is decreased gradually (solid line 41), that of the second sound presenting device is increased gradually (solid line 42). Combined with the visible information 23, the pieces of sound information allow the driver to recognize more reliably that the object is approaching the vehicle from the right side. If judging that an object is approaching the vehicle from the left side, the control unit 12 decreases the output sound pressure of the second sound presenting device gradually and increases that of the first sound presenting device gradually.

Alternatively, the control unit 12 may cause output of sound information from only the first sound presenting device if judging that an object is approaching the vehicle from the right side, and cause output of sound information from only the second sound presenting device if judging that an object is approaching the vehicle from the left side.

Where the safety confirmation assist device 1 uses vibration information, the safety confirmation assist device 1 is further equipped with a first vibration presenting device 31 and a second vibration presenting device 32 each of which generates vibration and which are installed on the right side 17 and the left side 19 of the driver, respectively, in the vehicle compartment.

Figure 10:
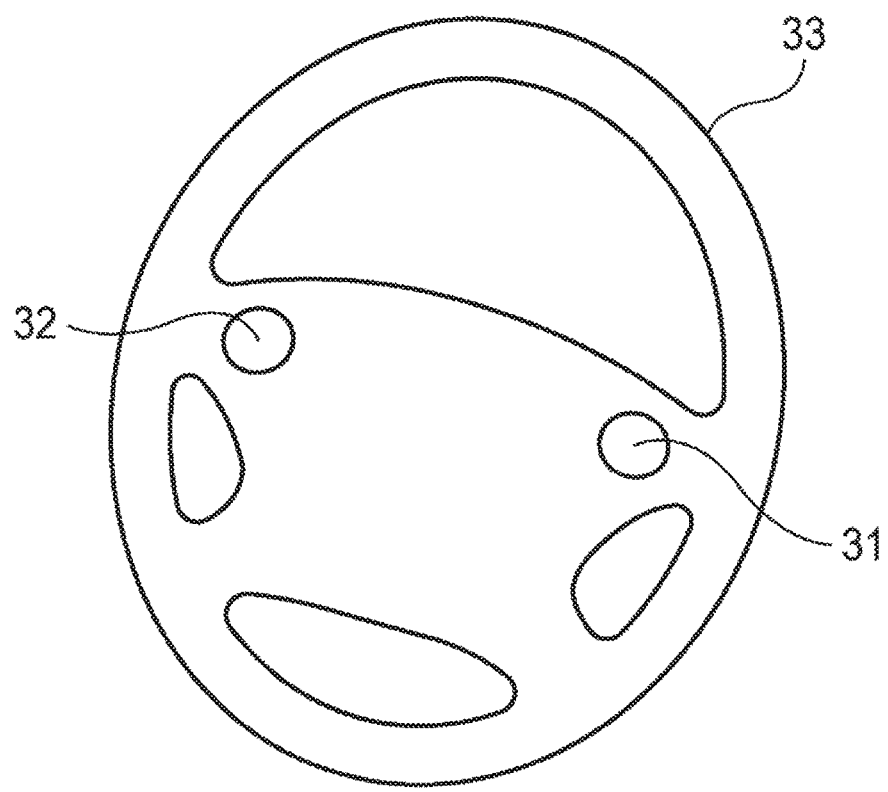
FIG. 10 is a schematic diagram showing example vibration presenting devices.

Each of the first vibration presenting device 31 and the second vibration presenting device 32 is a known vibrator, for example. As shown in FIG. 10, the first vibration presenting device 31 and the second vibration presenting device 32 are installed on a steering wheel 33 so as to be located on the right side and the left side of the rotation shaft, respectively, in a state that the steering wheel 33 is not rotated.

Figure 11:
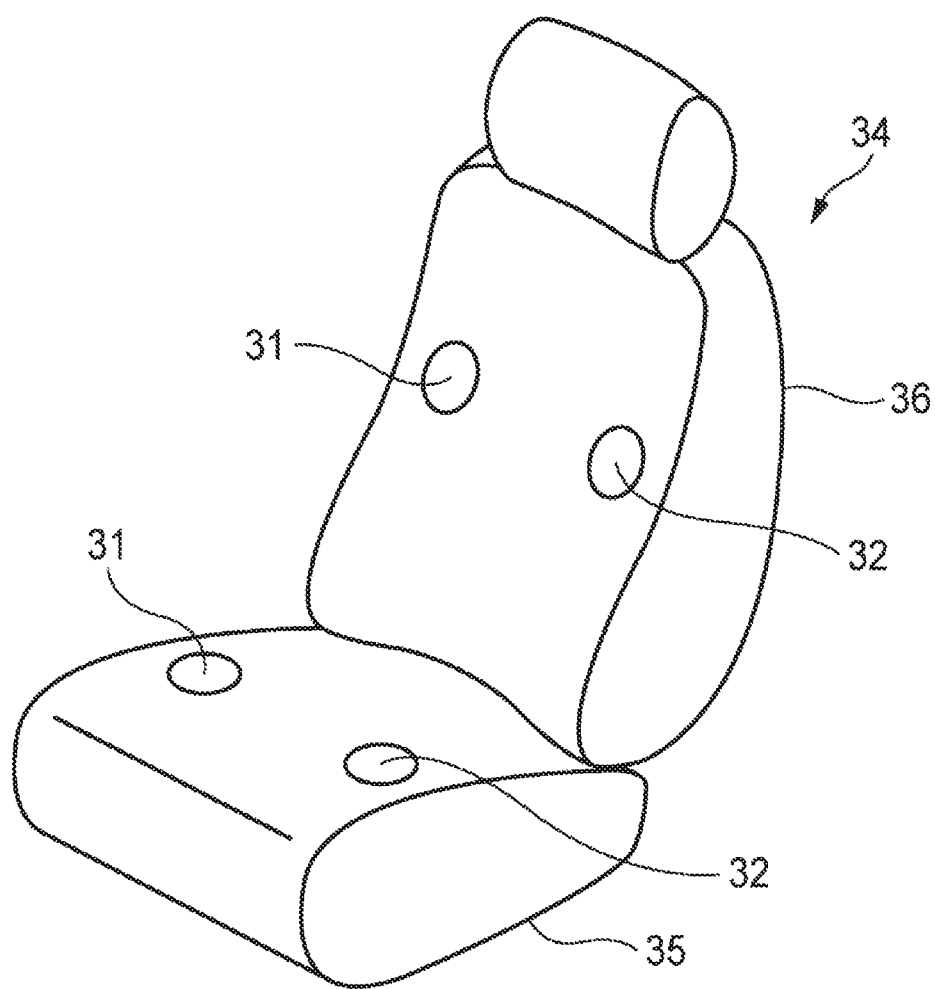
FIG. 11 is a schematic diagram showing another set of example vibration presenting devices.

Alternatively, as shown in FIG. 11, a first vibration presenting device(s) 31 and a second vibration presenting device(s) 32 may be installed on a driver seat 34. In this case, for example, the first vibration presenting device(s) 31 and the second vibration presenting device(s) 32 are installed on at least one of a seating cushion 35 and a backrest 36.

Figure 12:
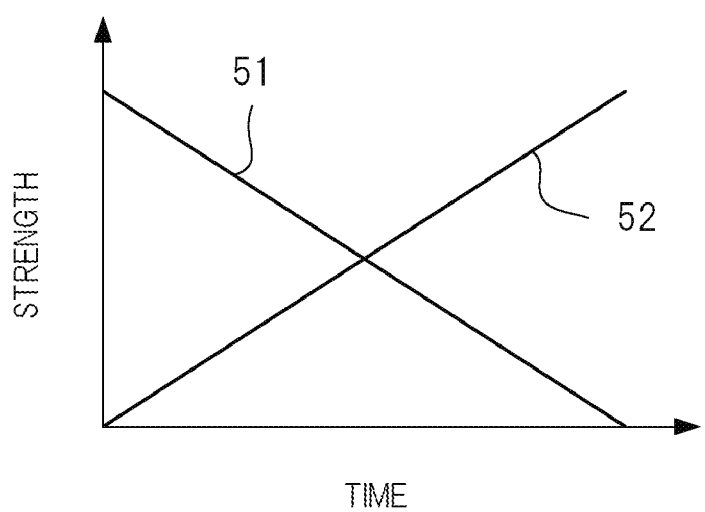
FIG. 12 is a graph showing a relationship between the time and the vibration strengths in a case that vibration is presented by the vibration presenting devices.

If judging that an object is approaching the vehicle from the right side, the control unit 12 causes presentation of visible information 23 in the above-described manner and also causes output of vibration information for notifying the driver that the object is approaching in such a manner that the output strength of the first vibration presenting device 31 is higher than that of the second vibration presenting device 32. As shown in FIG. 12, whereas the output strength of the first vibration presenting device 31 is decreased gradually (solid line 51), that of the second vibration presenting device 32 is increased gradually (solid line 52). Combined with the visible information 23, the vibration information allows the driver to recognize more reliably that the object is approaching the vehicle from the right side.

If judging that an object is approaching the vehicle from the left side, the control unit 12 decreases the output strength of the second vibration presenting device 32 gradually and increases that of the first vibration presenting device 31 gradually. Instead of varying the output strengths of the first vibration presenting device 31 and the second vibration presenting device 32, the vibration frequencies or the vibration amplitudes of the first vibration presenting device 31 and the second vibration presenting device 32 may be varied. As a further alternative, the control unit 12 may cause output of vibration from only the first vibration presenting device 31 if judging that an object is approaching the vehicle from the right side, and cause output of vibration from only the second vibration presenting device 32 if judging that an object is approaching the vehicle from the left side.

Embodiment 2

Next, a safety confirmation assist device according to a second embodiment of the invention will be described with reference to FIGS. 13-16.

Figure 13:
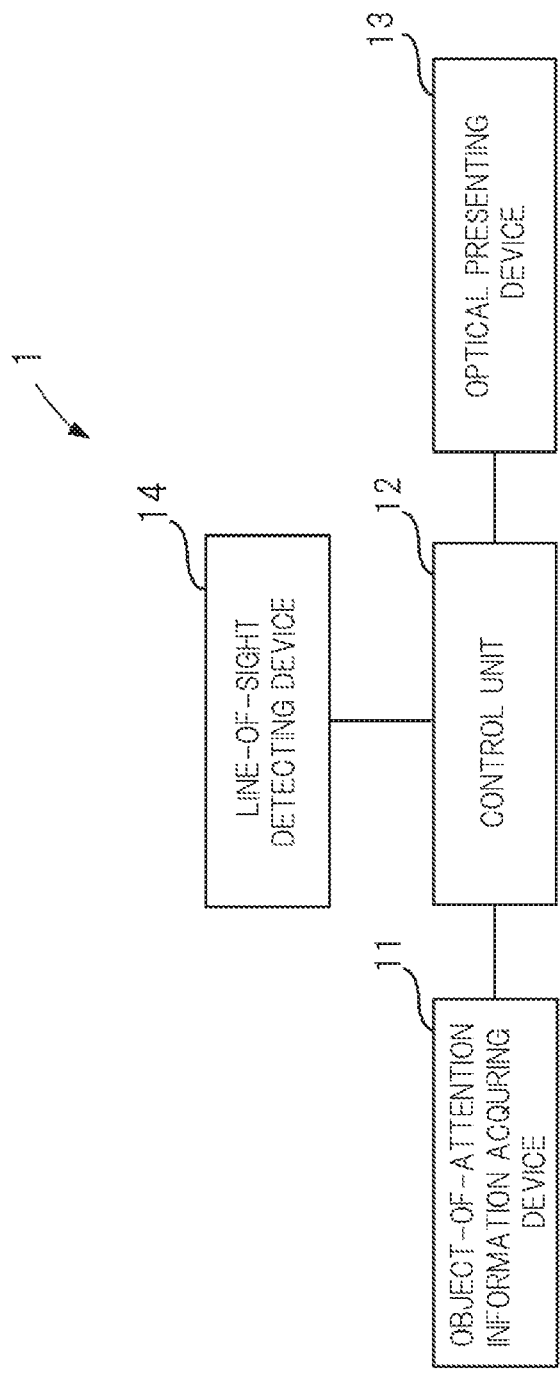
FIG. 13 is a block diagram showing an example configuration of a safety confirmation assist device according to a second embodiment.

FIG. 13 shows an example configuration of the safety confirmation assist device 1 according to the second embodiment. In the safety confirmation assist device disclosed in Patent document 1, pieces of visible information are presented at such positions that the driver who is looking forward in a driving direction can recognize them. Thus, if pieces of visible information are presented when the driver is looking at a scene located in a direction that is different from a driving direction, the driver may not realize the presentation of the pieces of visible information. In contrast, the safety confirmation assist device 1 according to the second embodiment is equipped with an object-of-attention information acquiring device 11 for detecting an object that is approaching the vehicle, a control unit 12 for causing an optical presenting device 13 to present visible information on the basis of information acquired by the object-of-attention information acquiring device 11, the optical presenting device 13 serving to present visible information on the windshield of the automobile, and a line-of-sight detecting device 14 for detecting a line of sight of the driver.

More specifically, the object-of-attention information acquiring device 11 has an infrared laser for measuring a direction and a distance of an object on the basis of a time difference and a phase difference between emitted infrared light and infrared light reflected from the object, and detects an object, such as another vehicle, a bicycle, or a pedestrian, that exists around the vehicle and is approaching it. When detecting an object, the object-of-attention information acquiring device 11 outputs, to the control unit 12, as object-of-attention information, a signal indicating a direction of the object relative to the vehicle and a distance between the vehicle and the object. The object-of-attention information is output repeatedly at a prescribed time interval.

The object-of-attention information acquiring device 11 may have, instead of or in addition to the infrared laser, a millimeter-wave radar, an ultrasonic radar, a camera, an intervehicle communication device for data communication between the vehicle and another vehicle, a road-to-vehicle communication device for data communication between the vehicle and roadside apparatus installed alongside a driving route, a pedestrian-to-vehicle communication device for data communication between the vehicle and a terminal held by a pedestrian, or the like.

The optical presenting device 13 is a device for presenting visible information at such a position that the driver who is looking forward in a vehicle driving direction can recognize it visually. For example, the optical presenting device 13 is configured in such a manner that a case housing a light source is installed inside the instrument panel and visible information 23 is presented on a windshield 29 of the vehicle by projecting output light onto the windshield 29 from a top portion of the case.

The line-of-sight detecting device 14, which includes, for example, an infrared camera, detects the direction of a line of sight of the driver on the basis of a positional relationship between the inner canthi and the pupils and other factors. The direction of a line of sight is defined as a straight line that extends from a base point that is the center of the straight line connecting the two pupils of the driver toward the viewing point of the driver. The line-of-sight detecting device 14 is installed at such a position (e.g., at a top portion of the windshield 29 or on the instrument panel, the steering column, or a meter) as to be able to shoot states of the eyeballs of the driver by the infrared camera.

The control unit 12 has a CPU, a RAM, a ROM, and an input I/F (none of which are shown), and a signal that is received from the object-of-attention information acquiring device 11 is input to the CPU or the RAM via the input I/F. The CPU performs various kinds of computation according to programs that are stored in the ROM in advance and outputs, to the optical presenting device 13, on the basis of computation results, a signal for causing the optical presenting device 13 to present visible information 23.

Upon acquiring object-of-attention information from the object-of-attention information acquiring device 11, the control unit 12 calculates a direction of an object relative to the vehicle on the basis of the object-of-attention information and calculates a time TTC (time-to-collision) to a collision between the vehicle and the object that will occur if the driver does not make a dodging manipulation on the basis of a variation of the relative distance between the vehicle and the object in a prescribed time.

If judging, on the basis of the TTC calculation result, that the object is close to the vehicle and it is necessary to let the driver to perform a dodging manipulation for dodging the object, the control unit 12 controls the optical presenting device 13 to cause it to present visible information 23 indicating that the object is approaching the vehicle. This judgment is made, for example, through comparison with a threshold value that is stored in the ROM in advance; the control unit 12 judges that presentation of visible information 23 is necessary if the TTC is shorter than the threshold value. Alternatively, the control unit 12 may judge that presentation of visible information 23 is necessary if the relative distance between the vehicle and the object is shorter than a predetermined threshold value, instead of using the TTC.

In the embodiment, the control unit 12 calculates a left-right component of a direction in which an object is approaching the vehicle on the basis of this direction, and controls the optical presenting device 13 so that it presents visible information 23 while moving it in the same direction as the calculated left-right component. In the embodiment, the term "vehicle left-right direction" means a left-right direction defined in a state that a scene ahead of the vehicle in a vehicle driving direction is viewed from the vehicle (base point).

In causing presentation of visible information 23, the control unit 12 acquires a signal indicating a line-of-sight direction of the driver from the line-of-sight detecting device 14 repeatedly at a prescribed time interval.

The control unit 12 is configured so as to control the optical presenting device 13 so that a movement range 25 of visible information 23 is located on the same side of a left/right boundary 21 that defines the left side and the right side using a line of sight of the driver as a reference, as the object approaching side of the vehicle in the left-right direction. The boundary 21 is a vertical plane that is perpendicular to the road surface (horizontal surface) and includes a straight line indicating the above-mentioned line-of-sight direction of the driver.

Figure 14:
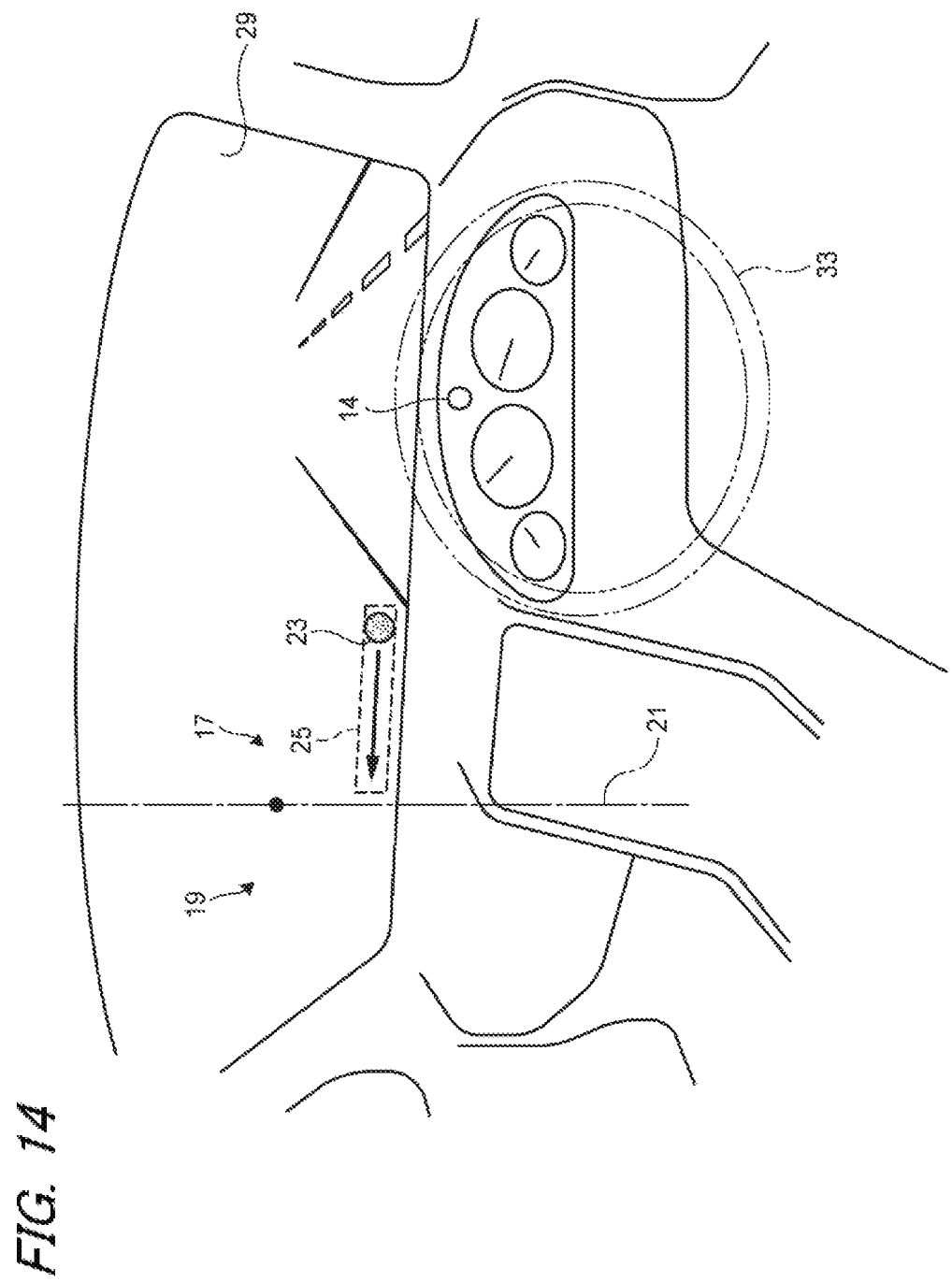
FIG. 14 is a front view showing an example manner of presentation of visible information for warning that an object of attention is approaching.

In FIG. 14, the boundary 21 is drawn as a straight line that passes through the intersecting point of the line of sight of the driver and the windshield 29 and extends perpendicularly to the road surface when the driver is looking at a scene that is deviated leftward from a vehicle driving direction. If the object-of-attention information acquiring device 11 detects an object that is approaching the vehicle from the right side, the control unit 12 controls the optical presenting device 13 so that as shown in FIG. 14 the movement range 25 of visible information 23 is located on the right side of the line of sight of the driver, that is, on the right side 17 of the boundary 21.

The control unit 12 sets a finishing end, where a series of movements of visible information 23 is to finish, of the movement range 25 of the visible information 23 at a position that is not located on the other side of the boundary 21. With this measure, when looking at the visible information 23 presented by the optical presenting device 13, the driver can recognize reliably that the object is approaching the vehicle from the right side and can perform a manipulation for dodging the approaching object.

If the line-of-sight direction of the driver is changed while visible information 23 is presented on the optical presenting device 13 on the basis of a signal that is input from the line-of-sight detecting device 14, the control unit 12 may move the movement range 25 according to a movement amount of the line-of-sight direction in such a manner that the movement range 25 does not cross the boundary 21. For example, the control unit 12 stores distances between the boundary 21 and a starting end and a finishing end of movement of visible information 23 in the ROM in advance. The control unit 12 controls the optical presenting device 13 so that the distances between the boundary 21 and the starting end and the finishing end of movement of visible information 23 always coincide with the values stored in advance irrespective of a change of the line-of-sight direction.

The control unit 12 may abstain from moving the movement range 25 of visible information 23 if a movement amount of the line-of-sight direction is smaller than a predetermined value. This measure can prevent the movement range 25 from moving uselessly following the line-of-sight direction. For example, the predetermined value is set at such a value that the movement range 25 does not cross the boundary 21 even if the line-of-sight direction is moved.

The control unit 12 may vary at least one of the color, movement speed, luminance, stroke width, optical image size, and repetition frequency of visible information 23 according to the TTC value or the relative distance between the vehicle and an object. In this case, for example, the control unit 12 increases the movement speed, luminance, stroke width, optical image size, or repetition frequency or varies the color of visible information 23 from a bluish color to a color (e.g., reddish color) that would arouse attention of the driver as the TTC value becomes smaller or the relative distance becomes shorter. That is, the control unit 12 tries to arouse more attention of the driver as the TTC value becomes smaller. Alternatively, the control unit 12 may vary at least one of the color, movement speed, luminance, stroke width, optical image size, and repetition frequency of visible information 23 according to the variation of the relative distance rather than the TTC value or the relative distance between the vehicle and an object. In this case, the control unit 12 causes presentation of a display that would arouse more attention of the driver as the variation of the relative distance increases.

In FIG. 14, the movement range 25 of the visible information 23 extends in the horizontal direction, that is, perpendicularly to the boundary 21. However, the invention is not limited to this case; the movement range 25 may be formed on the windshield 29 so as to form an inclination angle with the horizontal direction. The inclination angle may be in such a range as to allow the driver to recognize that an object is approaching the vehicle from its left side or right side when he or she looks at moving visible information 23.

Figure 15:
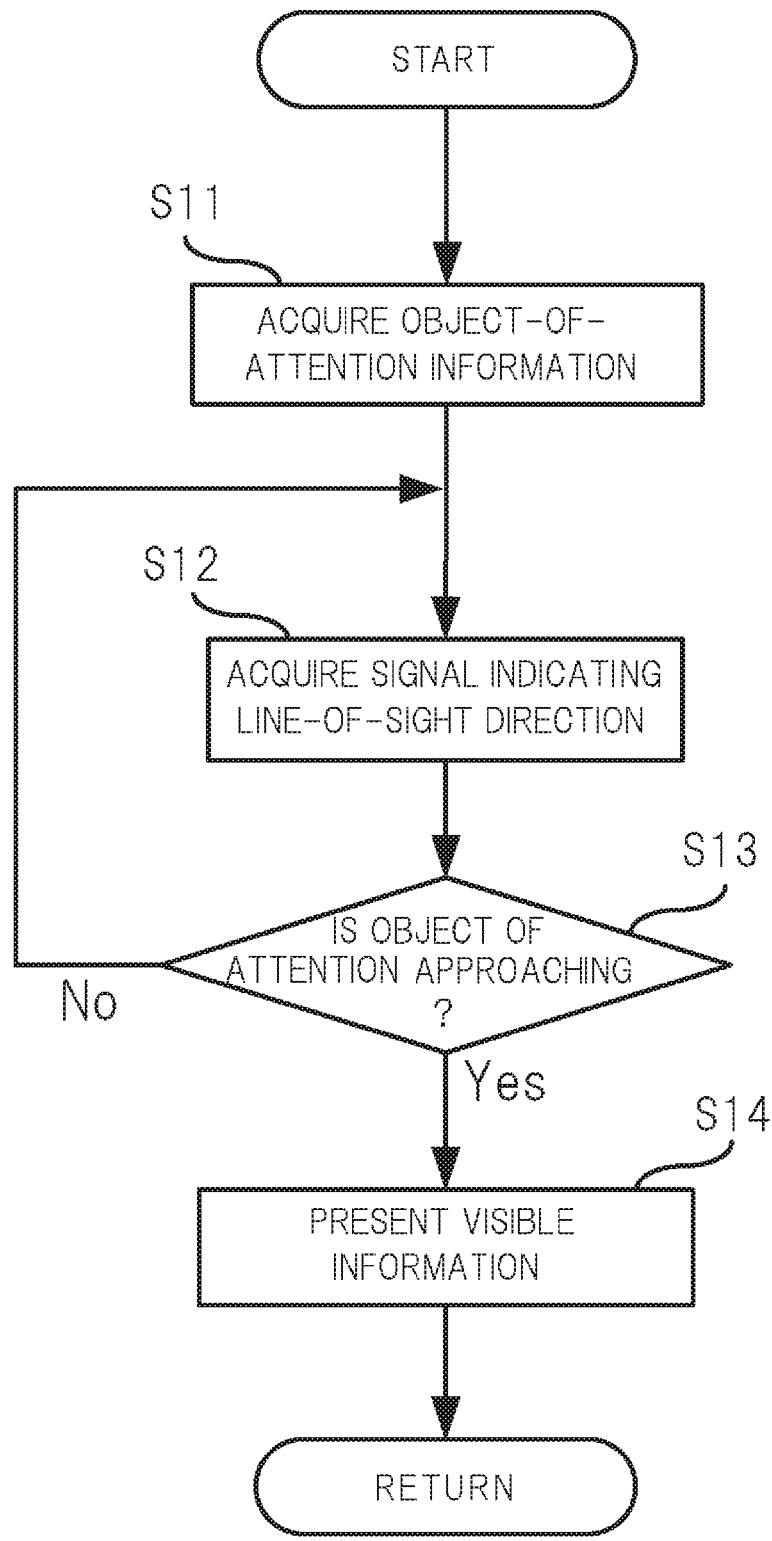
FIG. 15 is a flowchart illustrating the details of a control for causing an optical presenting device used in the second embodiment to present visible information.

FIG. 15 is a flowchart illustrating the details of a control for causing the optical presenting device 13 to present visible information 23. A control program for this purpose is stored in the ROM of the control unit 12 and run by the CPU.

First, at step S11, the CPU acquires object-of-attention information from the object-of-attention information acquiring device 11 repeatedly at a prescribed time interval.

Then, at step S12, the CPU acquires a signal indicating a line-of-sight direction of the driver from the line-of-sight detecting device 14.

Subsequently, at step S13, the CPU judges, on the basis of the object-of-attention information acquired at step S11, whether to cause the optical presenting device 13 to display visible information 23 indicating that an object that may collide with the vehicle is approaching.

The object-of-attention information includes a direction of an object relative to the vehicle and a distance from the vehicle to the object. Thus, the CPU calculates a TTC on the basis of the distance from the vehicle to the object and a variation of the distance, and judges that an object that may collide with the vehicle is approaching it if the TTC is smaller than a threshold value.

If judging that an object that may collide with the vehicle is approaching it (S13: yes), the CPU sends the optical presenting device 13 a signal for causing it to present visible information 23 at step S14. At this time, the CPU judges, on the basis of the object-of-attention information, whether the object is located on the left side or the right side of the vehicle. If judging that the object is located on the right side of the vehicle, the CPU causes the optical presenting device 13 to display visible information 23 on the windshield 29 in such a manner that it is moved right to left. The CPU sets a starting end and a finishing end of a movement range 25 on the basis of the line-of-sight direction of the driver acquired at step S12 in such a manner that its finishing end is not located on the other side of the boundary 21 and, as a result, the entire movement range 25 (from its starting end to its finishing end) is presented on the right side 17 of the driver. On the other hand, if judging that the object is located on the left side of the vehicle, the CPU causes the optical presenting device 13 to display visible information 23 on the windshield 29 in such a manner that it is moved left to right. The CPU sets a starting end and a finishing end of a movement range 25 of a movement range 25 on the basis of the line-of-sight direction of the driver in such a manner that its finishing end is not located on the other side of the boundary 21 and, as a result, the entire movement range 25 (from its starting end to its finishing end) is presented on the left side 19 of the driver.

If the CPU judges at step S13 that no object that may collide with the vehicle is approaching, the process returns to step S11.

The above description is directed to the case that the control unit 12 sets a starting end and a finishing end of presentation of visible information at predetermined positions. However, the invention is not limited to this case; the control unit 12 may set a starting end of presentation of visible information at a point on a straight line from the driver to the object. With this measure, since the starting end of a movement range 25 of visible information is set on a straight line from the driver to the object, by looking at the visible information the driver can not only recognize that the object is approaching the vehicle from its left side or right side but also visually recognize a current position determined of the object.

Figure 16:
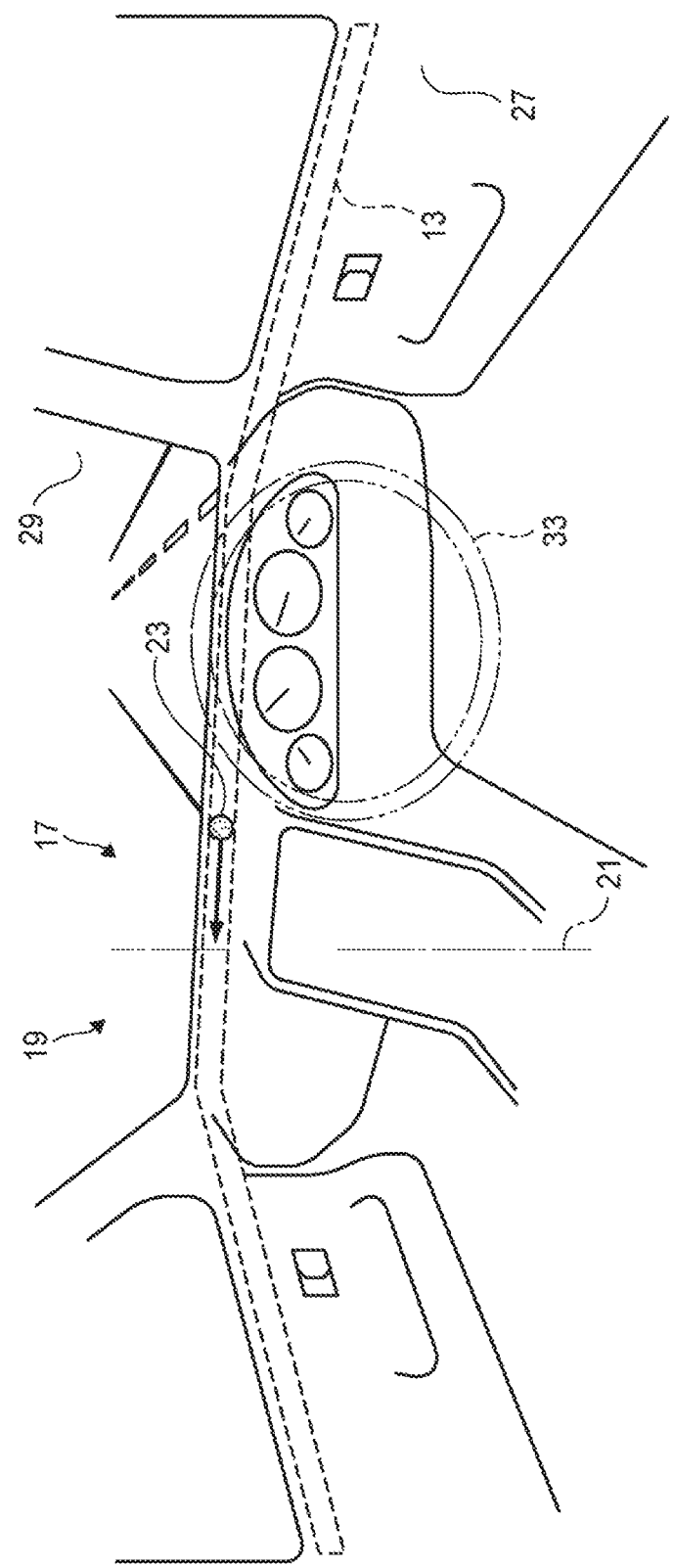
FIG. 16 is a front view showing an example manner of presentation in a case that the optical presenting device used in the second embodiment is installed in the whole of the vehicle compartment.

Although the above description is directed to the case that the optical presenting device 13 is a head-up display, as shown in FIG. 16 the optical presenting device 13 may be disposed on inner wall surfaces 27 of the instrument panel, doors, dashboard, etc. that form the vehicle compartment. For example, the optical presenting device 13 is composed of known light sources such as LEDs or light bulbs. Alternatively, a display may be formed on the inner wall surfaces 27 in such a manner that visible information is presented in a prescribed region of the display.

Although the above description is directed to the case that the safety confirmation assist device 1 notifies the driver of an approach of an object using only visible information 23, as in the first embodiment the safety confirmation assist device 1 may do so using sound information or vibration information in addition to visible information 23. In this case, controls similar to the controls described in the first embodiment with reference to FIGS. 9-12 are performed and hence are not described here.

Features of the above-described safety confirmation assist device according to the embodiments of the invention will be summarized below concisely in the form of items [1] to [12]:

[1] A safety confirmation assist device (1) comprising a presenting unit (optical presenting device 13) which presents visible information (23) at such a position that a driver can recognize it visually; an object detection unit (object-of-attention information acquiring device 11) which detects an object that is approaching a vehicle; and a control unit (12) which controls the presenting unit (optical presenting device 13) so that it presents the visible information (23) with a movement of the visible information in a same direction as a left-right component of a direction in which the object is approaching the vehicle if the object detection unit (object-of-attention information acquiring device 11) detects the object, wherein:

the control unit (12) controls the presenting unit (optical presenting device 13) so that a movement range of the visible information (23) is located on only a left side or a right side, being a same side of the vehicle as the object is located, of a boundary (21) that defines the left side and the right side for the driver who is looking forward in a driving direction.

[2] The safety confirmation assist device (1) according to item [1], wherein the control unit (12) controls the presenting unit (optical presenting device 13) so that a starting end, where movement of the visible information (23) is started, of the movement range of the visible information (23) is located on a straight line that connects the driver and the object.

[3] A safety confirmation assist device (1) comprising a presenting unit (optical presenting device 13) which presents visible information (23) at such a position that a driver can recognize it visually; an object detection unit (object-of-attention information acquiring device 11) which detects an object that is approaching a vehicle; a control unit (12) which controls the presenting unit (optical presenting device 13) so that it presents the visible information (23) with a movement of the visible information in a same direction as a left-right component of a direction in which the object is approaching the vehicle if the object detection unit (object-of-attention information acquiring device 11) detects the object; and a line-of-sight detecting unit (line-of-sight detecting device 14) which detects a line of sight of the driver, wherein:

the control unit (12) controls the presenting unit (optical presenting device 13) so that a movement range of the visible information (23) is located on only a left side or a right side, which is the same side of the vehicle as the object is located, of a boundary (21) that defines the left side and the right side using, as a reference, the line of sight of the driver detected by the line-of-sight detecting unit (line-of-sight detecting device 14).

[4] The safety confirmation assist device (1) according to item [3], wherein the control unit (12) controls the presenting unit (optical presenting device 13) so that the distances between the boundary (21) and a starting end where movement of the visible information is started and a finishing end where the movement is finished are kept constant.

[5] The safety confirmation assist device (1) according to any one of items [1] to [4], wherein the presenting unit (optical presenting device 13) projects the visible information (23) onto a windshield of the vehicle.

[6] The safety confirmation assist device (1) according to any one of items [1] to [4], wherein the presenting unit (optical presenting device 13) is disposed on inner wall surfaces (27) of a vehicle compartment of the vehicle.

[7] The safety confirmation assist device (1) according to any one of items [1] to [6], wherein:

the object detection unit (object-of-attention information acquiring device 11) detects a relative distance between the object and the vehicle; and the control unit (12) controls the presenting unit (optical presenting device 13) so that at least one of the movement speed, luminance, stroke width, and optical image size of the visible information (23) increases as the relative distance detected by the object detection unit becomes shorter.

[8] The safety confirmation assist device (1) according to any one of items [1] to [7], wherein:

the object detection unit (object-of-attention information acquiring device 11) detects a relative distance between the object and the vehicle; and the control unit (12) controls the presenting unit (optical presenting device 13) so that at least one of the movement speed, luminance, stroke width, optical image size, and repetition frequency of the visible information (23) increases as the variation of the relative distance detected by the object detection unit (object-of-attention information acquiring device 11) becomes larger.

[9] The safety confirmation assist device (1) according to any one of items [1] to [8], further comprising a first sound presenting device and a second sound presenting device each of which outputs sound information, wherein:

the first sound presenting device and the second sound presenting device are installed on the left side and the right side of the boundary, respectively; and the control unit (12) controls the first sound presenting device and the second sound presenting device so that the sound pressure of the sound information that is output from one, located on the left side or the right side of the driver, which is the same side of the vehicle as the object is located on, of the first sound presenting device and the second sound presenting device is decreased gradually and the sound pressure of the sound information that is output from the other, located on the left side or the right side of the driver, being the opposite side of the vehicle to the side where the object is located on, of the first sound presenting device and the second sound presenting device is increased gradually.

[10] The safety confirmation assist device (1) according to any one of items [1] to [8], further comprising a first sound presenting device and a second sound presenting device each of which outputs sound information, wherein:

the first sound presenting device and the second sound presenting device are installed on the left side and the right side of the boundary, respectively; and the control unit (12) controls the first sound presenting device and the second sound presenting device so that the one, located on the left side or the right side of the driver, which is the same side of the vehicle as the object is located on, of the first sound presenting device and the second sound presenting device outputs sound information.

[11] The safety confirmation assist device (1) according to any one of items [1] to [10], further comprising a first vibration presenting device (31) and a second vibration presenting device (32) each of which generates vibration, wherein:

the first vibration presenting device (31) and the second vibration presenting device (32) are installed on the left side and the right side of the driver, respectively; and the control unit (12) controls the first vibration presenting device (31) and the second vibration presenting device (32) so that the vibration strength of one, located on the left side or the right side of the driver, which is the same side of the vehicle as the object is located on, of the first vibration presenting device (31) and the second vibration presenting device (32) is decreased gradually and the vibration strength of the other, located on the left side or the right side of the driver, being the opposite side of the vehicle to the side where the object is located on, of the first vibration presenting device (31) and the second vibration presenting device (32) is increased gradually.

[12] The safety confirmation assist device (1) according to any one of items [1] to [10], further comprising a first vibration presenting device (31) and a second vibration presenting device (32) each of which generates vibration, wherein:

the first vibration presenting device (31) and the second vibration presenting device (32) are installed on the left side and the right side of the driver, respectively; and the control unit (12) controls the first vibration presenting device (31) and the second vibration presenting device (32) so that the one, located on the left side or the right side of the driver, which is the same side of the vehicle as the object is located on, of the first vibration presenting device (31) and the second vibration presenting device (32) generates vibration.

Although the invention has been described in detail by referring to the particular embodiments, it is apparent to those skilled in the art that various changes and modifications are possible without departing from the spirit and scope of the invention.

The invention provides an advantage that the manner of a driver's recognition of an approach of an object to pay attention to can be improved. Providing this advantage, the invention is useful when applied to safety confirmation assist device for assisting a safety check of a driver who is driving.

What is claimed is:

1. A safety confirmation assist device comprising:
an optical displaying device which presents visible information, at a position, visually recognizable to a driver of a vehicle;
an object detector which detects an object approaching the vehicle from a front left side or a front right side;
a control unit which controls the optical displaying device, if the object detector detects the object approaching the vehicle from the front left side or the front right side, to present the visible information moving in the same direction as a left-right component of a direction in which the object approaches the vehicle; and
a line-of-sight detector which detects a line of sight of the driver, wherein:
the control unit controls the optical displaying device so that a movement range of the visible information is located on only a left side or a right side, which is the same side of the vehicle as the object approaching the vehicle from the front left side or the front right side is located, of a boundary that is a plane perpendicular to a road surface, wherein the boundary defines the left side and the right side using, as a reference, the line of sight of the driver detected by the line-of-sight detector, and
the control unit controls the optical displaying device so that distances between the boundary and a starting end where movement of the visible information is started, and a finishing end where the movement is finished, are kept constant, and
wherein when a line-of-sight direction of the driver is changed from a driving direction, the control unit moves the movement range of the visible information according to a movement amount of the line-of-sight direction in such a manner that the movement range does not cross the boundary.

2. The safety confirmation assist device according to claim 1, wherein the optical displaying device projects the visible information onto a windshield of the vehicle.

3. The safety confirmation assist device according to claim 1, wherein the optical displaying device is disposed on inner wall surfaces of a vehicle compartment of the vehicle.

4. The safety confirmation assist device according to claim 1, wherein the optical displaying device is disposed in a whole of a vehicle compartment of the vehicle.

* * * * *